Dec. 3, 1935.  C. NELSON  2,022,868

PRESSURE COOKER

Filed Oct. 6, 1933   2 Sheets-Sheet 1

Inventor
CARL NELSON
By Paul, Paul Moore
ATTORNEYS

Dec. 3, 1935.  C. NELSON  2,022,868
PRESSURE COOKER
Filed Oct. 6, 1933  2 Sheets-Sheet 2

Inventor
CARL NELSON

By *[signature]*

ATTORNEYS

Patented Dec. 3, 1935

2,022,868

UNITED STATES PATENT OFFICE 2,022,868

PRESSURE COOKER

Carl Nelson, Eau Claire, Wis., assignor to National Pressure Cooker Company, Eau Claire, Wis., a corporation of Wisconsin Application October 6, 1933, Serial No. 692,391

16 Claims. (Cl. 220—55)

This invention relates to new and useful improvements in pressure cookers, and more particularly to means for securing the cover thereto in leak-proof relation.

An object of the invention is to provide in combination with a pressure cooker and its cover, a simple and inexpensive locking means for securing the cover to its seat, comprising means whereby the cover cannot accidentally be blown off the cooker body, in the event that said locking means is inadvertently actuated to release the cover before the pressure has been released from the cooker.

A further object is to provide in combination with a pressure cooker and its cover, an annular locking member adapted to engage means on the cover and cooker body to thereby force the cover into sealing engagement with its seat, and means necessitating that the cover be lifted to a predetermined position before it can be relatively rotated to permit its complete removal from the cooker body.

Other objects of the invention reside in the provision of a cooker body having outwardly projecting means thereon, and a cover for said body having outwardly projecting means adapted to overlie the corresponding means on the cooker body; in the annular locking member provided for securing the cover in sealing engagement with its seat; in the upright elements provided upon the cooker body and positioned to be engaged by means on the cover and thereby limit the relative rotary movement of the cover upon the cooker body and which elements are also adapted to restrict upward movement of the cover; in the means provided in connection with the locking means necessitating that the cover be lifted to a predetermined position before it can be completely removed from the cooker body; and in the specific construction of the cover securing means, which comprises an annular locking member of angular cross-section, and having its upper portion adapted to be seated upon the cover and its lower portion being provided with inwardly projecting means adapted to engage projections upon the cover, when said annular locking member is actuated to secure the cover to the cooker body.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
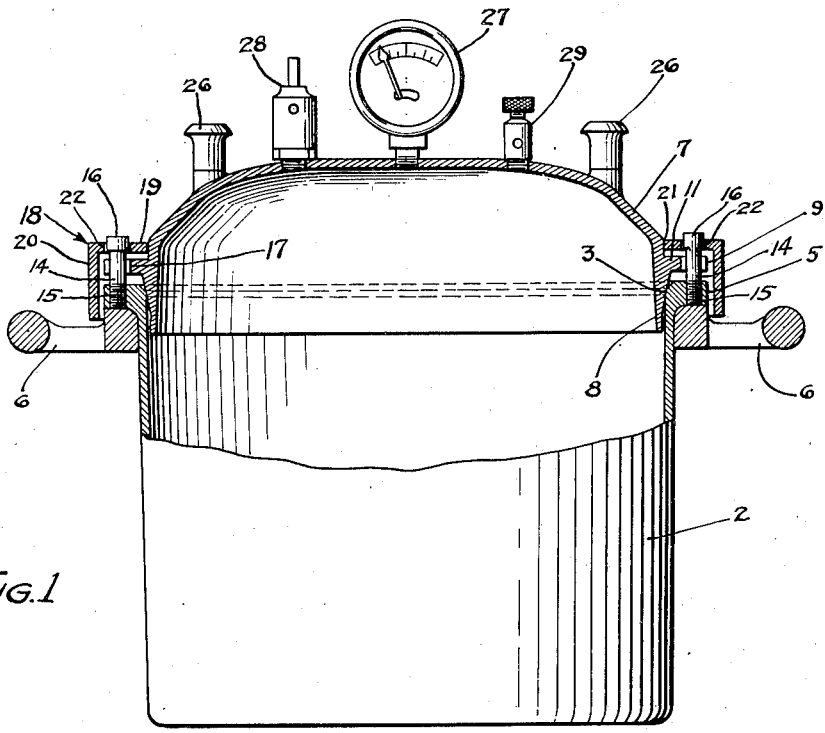
Figure 1 is a view in side elevation, partially broken away, showing the construction of the novel cover securing means herein disclosed.
Figure 2:
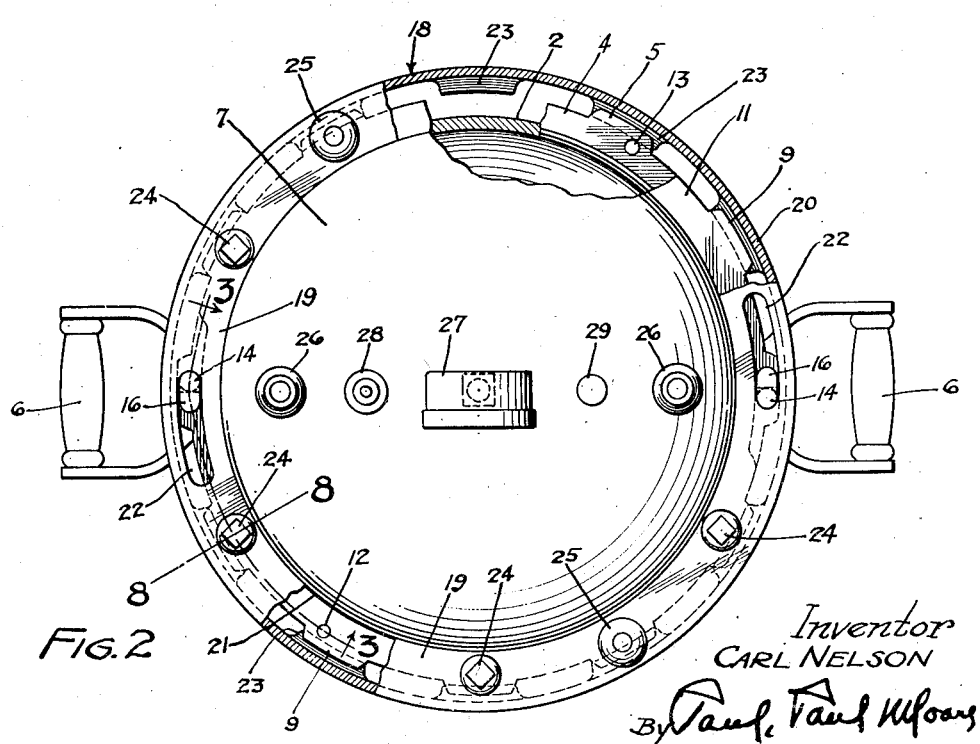
Figure 2 is a plan view of Figure 1, partially broken away.

In the selected embodiment of the invention here shown, there is illustrated in Figures 1 and 2, a pressure cooker similar to the one disclosed in my copending application, Serial No. 647,576, filed December 16, 1932, and which comprises a body portion 2, open at its upper end and provided with an annular tapered seat 3. The upper edge portion of the body 2 is shown turned outwardly to provide, in effect, a flange 4 having outwardly projecting spaced lugs 5 provided on its periphery, as clearly illustrated in Figure 2. Suitable handles 6 are shown secured to the cooker body, whereby it may be conveniently moved about from place to place.

Figure 5:
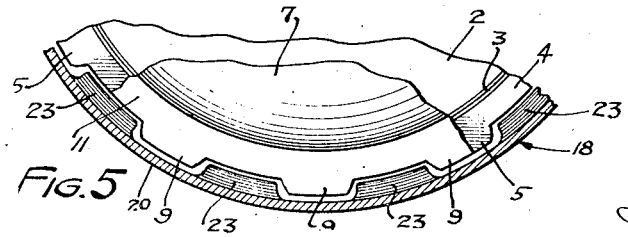
Figure 5 is a detail sectional plan view showing the arrangement of the cooperating means on the cooker body and locking member to facilitate securing the cover to the cooker body.

A cover 7 is shown having an annular tapered flange 8 adapted to engage the seat 3 in the cooker body 2, as shown in Figure 1. The cover has a plurality of outwardly projecting spaced lugs 9, which may be provided upon a suitable horizontally disposed annular flange 11 encircling the lower intermediate portion of the cover, and which overlies the flange 4 of the cooker body when the cover is seated thereon. The lugs 9 on the flange 11 of the cover are of substantially the same size as the lugs 5 on the cooker body, and are adapted to overlie said lugs 5, as shown in Figures 2 and 5.

Figure 3:
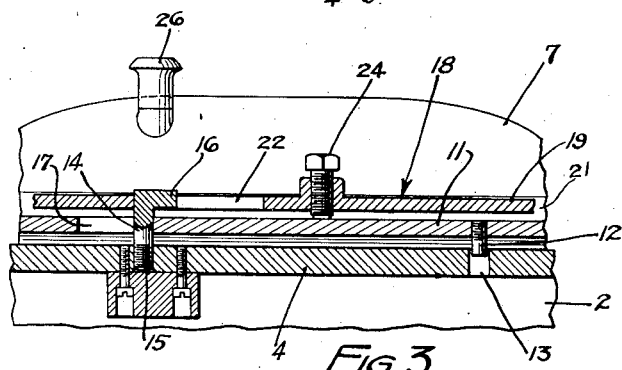
Figure 3 is a detail sectional view on the line 3—3 of Figure 2, showing one of the upright elements which operate to limit relative rotation of the cover upon the cooker body, and which also restricts its upward movement with respect thereto.
Figure 4:
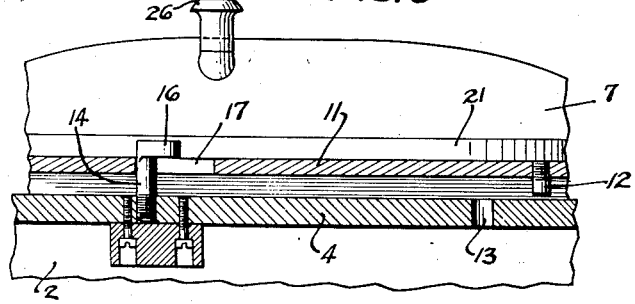
Figure 4 is a view similar to Figure 3, but showing the cover unlocked, or in a position whereby it may readily be removed from the cooker body.

Means is provided whereby the cover 7 must be lifted to a predetermined position, before it can be completely removed from the cooker body. Such means is best shown in Figures 3 and 4, and comprises two or more pins 12 secured to the flange 11 of the cover, and adapted to be received in suitable sockets 13 provided in the flange 4 of the cooker body. When the cover is in sealing engagement with the seat 3 of the cooker body, the pins 12 will be received in the sockets 13, as shown in Figure 3. Studs 14 are secured to the flange 4 of the cooker body by suitable threads 15, and have offset heads 16 adapted to restrict relative upward movement of the cover, when the pins 12 are positioned in the sockets 13, as shown in Figure 3, and the cover is released while under pressure.

It will thus be seen that when the cover is in the position shown in Figure 3, it cannot be relatively rotated upon the cooker body because of the pins 12 being received in the slots 13. The cover must therefore be lifted to a position to move the pins 12 out of the sockets 13, before it can be rotated to permit its removal from the cooker body. Relative upward movement of the cover is restricted by the heads 16 of the studs 14, which overhang the flange 11 of the cover when the latter is positioned as shown in Figure 3. The studs 14 are received in recesses 17 in the flange 11 of the cover, and provide means for limiting the relative rotary movement of the cover upon the cooker body, in the operation of securing it thereto or removing it therefrom.

The means for locking the cover 7 to the cooker body comprises an annular locking ring or member, generally indicated by the numeral 18, and shown constituted of an upper horizontal web 19 and a vertical wall portion 20. The locking ring 18 fits over the flange 11 of the cover with the inner edge of its web 19 substantially engaging the cylindrical portion 21 of the cover, whereby it is centered on said cover. Elongated openings 22 are provided in the web 19 of the ring 18 adapted to receive the upper ends of the studs 14, as clearly illustrated in Figures 2 and 3.

A plurality of inwardly projecting lugs 23 are provided upon the lower edge of the vertical wall portion 20 of the ring 18, adapted to engage the lugs 5 provided upon the periphery of the flange 4 of the cooker body, as best shown in Figure 2. A plurality of screws 24 are mounted in the upper flange 19 of the ring and are adapted to engage the flange 11 of the cover to thereby force the latter into engagement with its seat 3, as will readily be understood by reference to Figure 8. The lugs 23 of the ring engage the bottom faces of the lugs 5 of the cooker body and thereby prevent upward movement of the ring 18, when the screws 24 are screwed downwardly into engagement with the flange 11 of the cover.

The ring is shown provided with suitable hand grips 25, whereby it may be conveniently removed from the cover when it is desired to remove the latter from the cooker body. In like manner, the cover 7 is provided with suitable hand grips 26 whereby it may be conveniently handled when placing it upon or removing it from the cooker body. The cover is also shown provided with the usual pressure gauge 27, safety valve 28, and pressure release valve 29.

Figure 6:
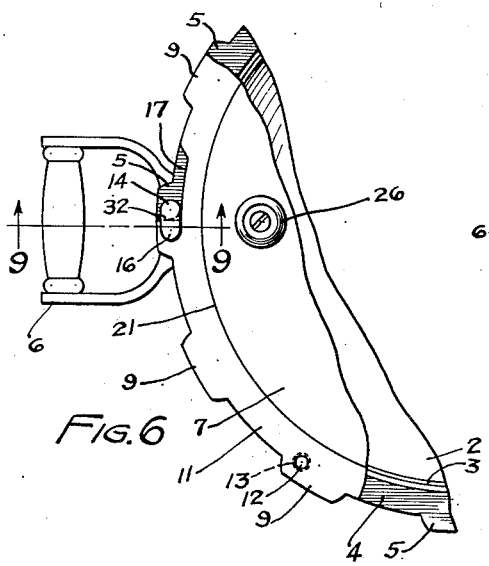
Figure 6 is a detail plan view showing the cover in operative position upon the cooker body.
Figure 7:
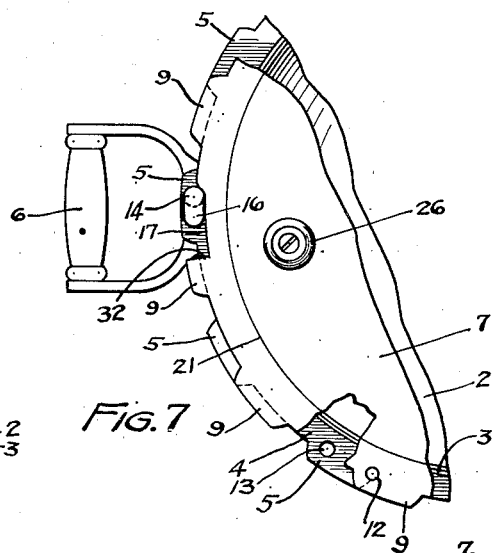
Figure 7 is a similar view showing the cover relatively rotated upon the cooker body whereby it may be removed therefrom.
Figure 8:
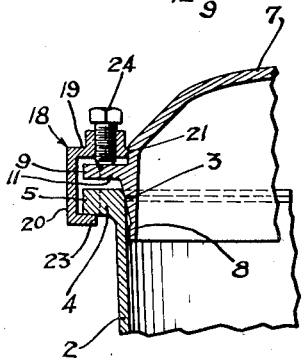
Figure 8 is a detail sectional view on the line 8—8 of Figure 2, showing the means for actuating the locking member to secure the cover to the cooker body.

When the cover 7 is to be secured to the cooker body, it is seated thereon, as shown in Figure 1, the studs 14 being received in the recesses 17 provided in the flange 11 of the cover, as shown in Figures 6 and 7. The cover is then relatively rotated upon the cooker body from the position shown in Figure 7 to that shown in Figure 6, whereby the end walls 32 of the recesses 17 of the cover will engage the studs 14, as shown in Figure 6. When the cover is thus positioned, the pins 12 thereof will be received in the sockets 13 provided in the flange 4 of the cooker body, whereby the tapered flange 8 of the cover will move into sealing engagement with the seat 3 of the cooker body, as shown in Figures 1 and 8. The locking ring 18 is then positioned upon the cover 7, as hereinbefore described, and the screws 24 operated to secure the cover in sealing engagement with the seat 3, as will readily be understood by reference to Figures 3 and 8.

Figure 9:
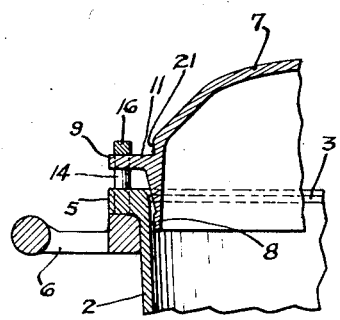
Figure 9 is a detail sectional view on the line 9—9 of Figure 6, showing the cover unseated to permit the escape of steam or pressure from the interior of the cooker.

To remove the cover from the cooker body, the screws 24 are operated to release the cover, whereupon the pressure within the cooker body, in the event that it has not been previously released by the operator by manipulation of the valve 29, may force the cover upwardly against the heads 16 of the studs 14, as best shown in Figure 9, whereby the pressure in the cooker is released before the cover can be completely removed therefrom. When the flange 11 of the cover is thus engaged with the heads 16 of the studs 14, the pins 12 will be moved out of their respective sockets 13, as shown in Figure 3, whereby the cover may be relatively rotated in a counter-clockwise direction, or from the position shown in Figure 3 to that shown in Figure 4, to thereby permit the complete removal of the cover from the cooker body. Before the cover can again be moved into engagement with its seat 3, it must be relatively rotated upon the cooker body to move the pins 12 into alinement with the sockets 13, as will readily be understood by reference to Figure 3.

It is to be understood that when the cover is removed from the cooker body, the locking ring 18, after having been released by actuation of the screws 24, is removed from the cover and cooker. To remove this ring, it is relatively rotated upon the flange 11 of the cover until its lugs 23 register with the spaces provided between the lugs 5 of the cooker body and the lugs 9 on the cover, as shown in Figure 5, whereby the ring may readily be removed from the apparatus. When the cover is in sealing engagement with the seat 3 of the cooker body, its lugs 9 are substantially alined with the lugs 5 of the cooker body, as shown in Figures 2 and 5.

From the foregoing, it will be seen that the cover securing means herein disclosed necessitates that the cover be lifted out of engagement with its seat to a predetermined position before it can be relatively rotated upon the cooker to permit its complete removal therefrom, thereby positively preventing the cover from accidentally being blown off the cooker, should it accidentlly be released while the cooker is under pressure.

The screws 24 for securing the cover 7 in sealing engagement with the cooker body are here shown provided with square heads requiring the use of a suitable instrument, such as a wrench for tightening them. If desired, screws provided with suitable T-heads may be used in lieu of the screws 24, to thereby dispense with a separate wrench.

The order of the pins 12 and sockets 13 may also be reversed without departing from the scope of the invention.

I claim as my invention:

1. A pressure cooker comprising a body having a seat therein and a cover fitting in said seat, outwardly projecting means on said body, outwardly projecting means on the cover overlying the corresponding means on said body, an annular one-piece locking member fitting over the outwardly projecting means on the cover and having means extending inwardly and adapted to be positioned beneath the outwardly projecting means on the cooker body, and means movably mounted in said annular locking member and cooperating therewith to force the closure into sealing engagement with said seat.

2. A pressure cooker comprising a body having a seat therein and a cover fitting in said seat, outwardly projecting means on said body, outwardly projecting means on the cover overlying the corresponding means on said body, an annular one-piece locking member fitting over the outwardly projecting means on the cover and having means engaging the outwardly projecting means on the cooker body, means movably mounted in said locking member for forcing the cover into sealing engagement with said seat, means necessitating that the cover be relatively rotated upon said body before it can be moved into sealing engagement with its seat, and means whereby the cover must be unseated, before it can be relatively rotated upon the cooker to permit its complete removal therefrom.

3. A pressure cooker comprising a body having a seat therein and a cover fitting in said seat, spaced radial lugs on the upper portion of said body, an annular locking member adapted to be supported upon the cover and having inwardly extending lugs positioned at an elevation below the lugs on the cooker body and adapted to be moved into vertical alinement therewith to prevent relative upward movement thereof, when the cover is secured to its seat, means in said locking member for forcing the cover onto said seat, and means on the cover and cooker body necessitating that the cover be relatively rotated upon the cooker body before it can be seated, and whereby it must be lifted from its seat before it can be relatively rotated to permit its complete removal from the cooker body.

4. A pressure cooker comprising a body having a seat therein and a cover fitting in said seat, spaced radial lugs on the upper portion of said body, a detachable annular locking member adapted to be supported upon the cover and having inwardly extending lugs positioned at an elevation below the lugs on the cooker body, said cover being adapted for limited rotation to move its lugs into vertical alinement with the lugs on the cooker body, thereby to prevent relative upward movement thereof when the cover is secured to its seat, means in said locking member for forcing the cover onto said seat, and means on the cover and cooker body necessitating that the cover be relatively rotated upon the cooker before it can be seated, and whereby it must be lifted from its seat before it can be relatively rotated to permit its complete removal from the cooker body.

5. A pressure cooker compriisng a body having a seat therein and a cover fitting in said seat, spaced radial lugs on the upper portion of said body, a detachable annular locking member adapted to be supported upon the cover and having inwardly extending lugs positioned at an elevation below the lugs on the cooker body, means on the cooker body permitting limited rotation of said locking member relatively to said cooker body and cover, and whereby the lugs on said member may be moved into vertical alinement with the lugs on the cooker body to prevent relative upward movement thereof when the cover is secured to its seat, and means carried by the locking member for forcing the cover onto said seat.

6. A pressure cooker comprising a body having a seat therein and a cover fitting in said seat, a plurality of spaced radial lugs on the upper portion of said body, an outwardly turned flange on the cover, an annular locking member adapted to be seated on said flange and having inwardly extending lugs adapted to engage the bottom faces of the lugs on the cooker body, means whereby said locking member may be relatively rotated to move its lugs into alinement with the lugs on the cooker body, and threaded means in said locking member adapted to engage the flange on said cover to thereby force the cover into sealing engagement with its seat, when the lugs on the locking member are operatively engaged with the lugs on the cooker body.

7. A pressure cooker comprising a body having a seat therein and a cover fitting in said seat, a plurality of spaced radial lugs on the upper portion of said body, an outwardly turned flange on the cover, an annular locking member adapted to be seated on said flange and having inwardly extending lugs adapted to engage the bottom faces of the lugs on the cooker body, means whereby said locking member may be relatively rotated to move its lugs into alinement with the lugs on the cooker body, and threaded means movably mounted on the locking member and adapted to force the cover into sealing engagement with said seat, when the lugs on the locking member are alined with the lugs on the cooker body.

8. A pressure cooker comprising a body having a seat therein and a cover fitting in said seat, a plurality of spaced radial lugs on the upper portion of said body, an outwardly turned flange on the cover, an annular locking member adapted to be seated on said flange and having inwardly extending lugs adapted to engage the bottom faces of the lugs on the cooker body, means whereby said locking member may be relatively rotated to move its lugs into alinement with the lugs on the cooker body, threaded means in said locking member adapted to engage the flange on said cover to thereby force the cover into sealing engagement with its seat, when the lugs on the locking member are operatively engaged with the lugs on the cooker body, and means on the cover and cooker body necessitating that the cover be relatively rotated upon the cooker body before it can be seated, and whereby it must be lifted from its seat to a predetermined position before it can be relatively rotated to permit its complete removal from the cooker body.

9. A pressure cooker comprising a body having a seat therein and provided at its upper end with a plurality of outwardly extending projections, a cover adapted to be fitted onto said seat and having a plurality of outwardly extending projections thereon alined with the projections on the cooker body when the cover is secured to said seat, a clamping member seated on the cover and having means engageable with the projections on the cooker body for holding the cover on the seat, and means necessitating that the cover be lifted from its seat to a predetermined position before it can be completely removed from the cooker body.

10. A pressure cooker comprising a body having outwardly projecting spaced means at its upper portion, a cover for said body having outwardly projecting spaced means on its periphery adapted to be moved into registration with the outwardly projecting means on the cooker body, means secured to the cooker body for limiting relative rotary and upward movements of the cover, a detachable clamping member for securing the cover to said body, and means necessitating that the cover be moved out of sealing engagement with the cooker body before it can be relatively rotated to permit its complete removal from the cooker body.

11. A pressure cooker comprising a body having an upper edge and a seat adjacent thereto, a cover having means adapted to engage said seat and provided with outwardly extending means, an upright element on the upper edge of the cooker body having an offset head, said element limiting rotary movement of the cover on the cooker body, means for securing the cover to said seat, and said element also restricting relative upward movement of the cover should said securing means be actuated to release said cover, while the cooker is under pressure.

12. A pressure cooker comprising a body having an upper edge and a seat adjacent thereto, a cover having means adapted to engage said seat and provided with outwardly extending means, an upright element on the upper edge of the cooker body having an offset head, said element being adapted to be engaged by the cover and thereby limit relative rotary movement of said cover on the cooker body, an annular locking member seated on the cover and having an opening therein to receive said element, and whereby rotary movement of said locking member is restricted, and means cooperating with said locking member to secure the cover to the cooker body.

13. A pressure cooker comprising a body having an upper edge and a seat adjacent thereto, a cover having means adapted to engage said seat and provided with outwardly extending means, an upright element on the upper edge of the cooker body having an offset head, said element being adapted to be engaged by the cover and thereby limit relative rotary movement of said cover on the cooker body, an annular locking member seated on the cover and having an opening therein to receive said element, and whereby rotary movement of said locking member is restricted, means for actuating said locking member to secure the cover to the cooker body, said element also being adapted to limit upward movement of the cover, when said locking member is actuated to release said cover, and means necessitating that the cover be lifted from its seat to a predetermined position before it can be completely removed from the cooker body.

14. A pressure cooker comprising a body having a seat therein, a cover removably fitting said seat, an annular clamping ring adapted to be fitted over the outer marginal edge portion of said cover and having a portion extending downwardly therefrom, means on the cooker body adapted to be engaged by said downwardly extending portion, and means on the clamping ring for forcing the cover into engagement with said seat in leak-proof fashion.

15. A pressure cooker comprising a body having a seat therein, a cover removably fitting said seat, an annular clamping ring adapted to be fitted over the outer marginal edge portion of said cover and having a portion extending downwardly therefrom, means for axially alining said clamping ring with the cover, means on the cooker body adapted to be engaged by the downwardly extending portion of said ring for locking the cover to the cooker body, and means on the clamping ring for axially forcing the cover into engagement with said seat.

16. A pressure cooker comprising a body having an annular seat therein, a cover removably fitting said seat, an annular clamping ring of angular cross section having a horizontal web portion adapted to engage a portion of said cover, said clamping ring also having a downwardly extending cylindrical portion encircling the upper portion of the cooker body and provided with suitable locking elements, and means supported in said clamping ring for axially translating the cover to force it into engagement with its seat.

CARL NELSON.